(12) United States Patent
Ashlock et al.

(10) Patent No.: US 12,580,837 B2
(45) Date of Patent: Mar. 17, 2026

(54) END-TO-END NETWORK PATH VISIBILITY ACROSS CLOUD APPLICATION ENVIRONMENTS

(71) Applicant: Cisco Technology, Inc., San Jose, CA (US)

(72) Inventors: Hans Ashlock, Berkeley, CA (US); Indermeet Singh Gandhi, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 104 days.

(21) Appl. No.: 18/218,785

(22) Filed: Jul. 6, 2023

(65) Prior Publication Data

US 2025/0016084 A1    Jan. 9, 2025

(51) Int. Cl.
*H04L 43/12*       (2022.01)

(52) U.S. Cl.
CPC ................................... *H04L 43/12* (2013.01)

(58) Field of Classification Search
CPC ................................ H04L 43/12; H04L 43/10
See application file for complete search history.

(56) References Cited

U.S. PATENT DOCUMENTS

| | | |
|---|---|---|
| 9,455,890 B2 | 9/2016 | Lad et al. |
| 10,778,502 B2 | 9/2020 | Rao |
| 10,848,403 B1 | 11/2020 | Schroeder |
| 10,972,370 B1 | 4/2021 | Peschka |
| 11,509,552 B2 | 11/2022 | Haddow et al. |
| 2014/0108665 A1* | 4/2014 | Arora .................... H04L 67/563 709/227 |
| 2019/0028345 A1* | 1/2019 | Kommula ........... H04L 41/0816 |
| 2019/0123984 A1* | 4/2019 | Nainar .................. H04L 43/062 |
| 2021/0075596 A1* | 3/2021 | Rohel .................... H04L 63/062 |
| 2021/0377338 A1* | 12/2021 | Pannem .................. H04L 41/40 |
| 2022/0121556 A1* | 4/2022 | Guim Bernat ...... G06F 11/3495 |

OTHER PUBLICATIONS

"Getting Started with Path Visualization", online: https://docs. thousandeyes.com/product-documentation/internet-and-wan-monitoring/ viewing-data/getting-started-with-path-visualization, accessed Jun. 22, 2023, 5 pages.
"Unlock your productivity potential with Slack Platform", online: https://api.slack.com/, accessed Jun. 22, 2023, 8 pages.

* cited by examiner

*Primary Examiner* — Farzana B Huq
(74) *Attorney, Agent, or Firm* — Lee & Hayes, P.C.

(57)       ABSTRACT

In one embodiment, a device identifies a port associated with a backend probing agent for a cloud-hosted application. The device performs external probing of a path to the cloud-hosted application by sending a probe along the path to the port, to generate external probing results. The device triggers the backend probing agent to generate backend probing results by performing backend probing of a backend service used by the cloud-hosted application. The device causes formation of unified probing results that correlate the external probing results and the backend probing results.

17 Claims, 9 Drawing Sheets

600

605

START

610

IDENTIFY PORT ASSOCIATED WITH BACKEND PROBING AGENT

615

PERFORM EXTERNAL PROBING OF PATH TO CLOUD-HOSTED APPLICATION

620

TRIGGER BACKEND PROBING AGENT TO PERFORM BACKEND PROBING

625

CAUSE FORMATION OF UNIFIED PROBING RESULTS THAT CORRELATE THE EXTERNAL AND BACKEND PROBING RESULTS

630

END

END-TO-END NETWORK PATH VISIBILITY ACROSS CLOUD APPLICATION ENVIRONMENTS

TECHNICAL FIELD

The present disclosure relates generally to computer networks, and, more particularly, to end-to-end network path visibility across cloud application environments.

BACKGROUND

More and more enterprises are running applications in the cloud and consuming applications that run in the cloud. Synthetic network probing tools provide powerful insights into the performance of applications from the vantage point of virtually any location in the world. Using both application level protocols and network level protocols, synthetic probing can provide application performance telemetry, as well as network performance telemetry (e.g., latency, loss, jitter, etc.). Furthermore, synthetic probing tools today can also perform path trace analysis to provide a hop-by-hop visualization and performance of the network path taken from any packet originating from the origin of measurement to the destination application/service. This kind of correlation between network performance, path visibility, and application performance is important in the goal of accomplishing full-stack observability.

However, once a request is made to a web/cloud-based application, such as a page load request from a browser or an application programming interface (API) request, the application itself may make any number of backend requests of its own to other services. These backend services could include external services that are hosted in other cloud providers or data centers. This means that these backend requests can traverse non-trivial networks, like the Internet. Effectively, this creates a blind spot with respect to the synthetic probing, preventing the probing system from obtaining end-to-end visibility with respect to the cloud-hosted application.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
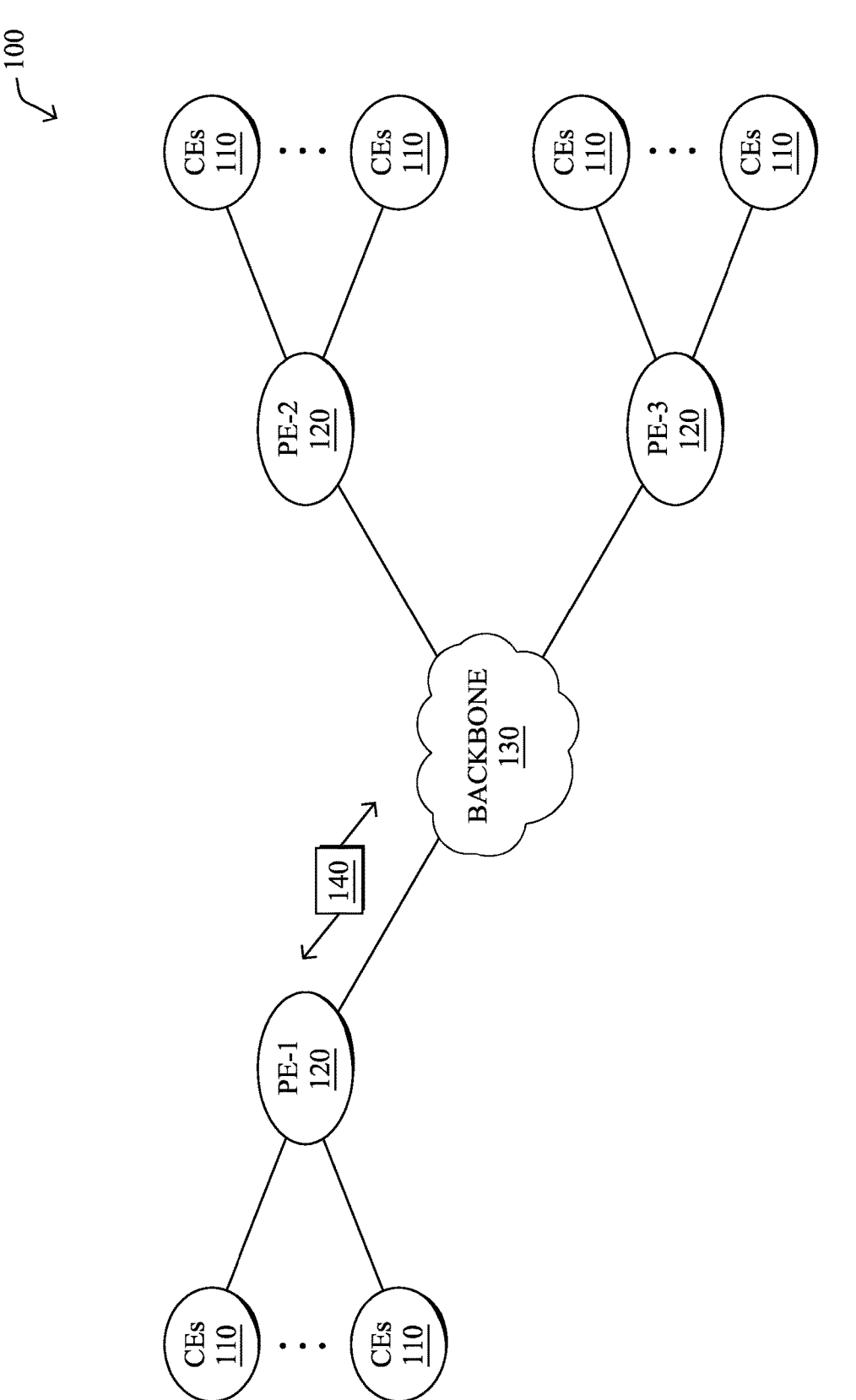
FIGS. 1A-1B illustrate an example communication network.

According to one or more embodiments of the disclosure, a device identifies a port associated with a backend probing agent for a cloud-hosted application. The device performs external probing of a path to the cloud-hosted application by sending a probe along the path to the port, to generate external probing results. The device triggers the backend probing agent to generate backend probing results by performing backend probing of a backend service used by the cloud-hosted application. The device causes formation of unified probing results that correlate the external probing results and the backend probing results.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/ Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.
  2.) Site Type B: a site connected to the network by the CE router via two primary links (e.g., from different Service Providers), with potentially a backup link (e.g., a 3G/4G/5G/LTE connection). A site of type B may itself be of different types:
  2a.) Site Type B1: a site connected to the network using two MPLS VPN links (e.g., from different Service Providers), with potentially a backup link (e.g., a 3G/4G/5G/LTE connection).
  2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.
  2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
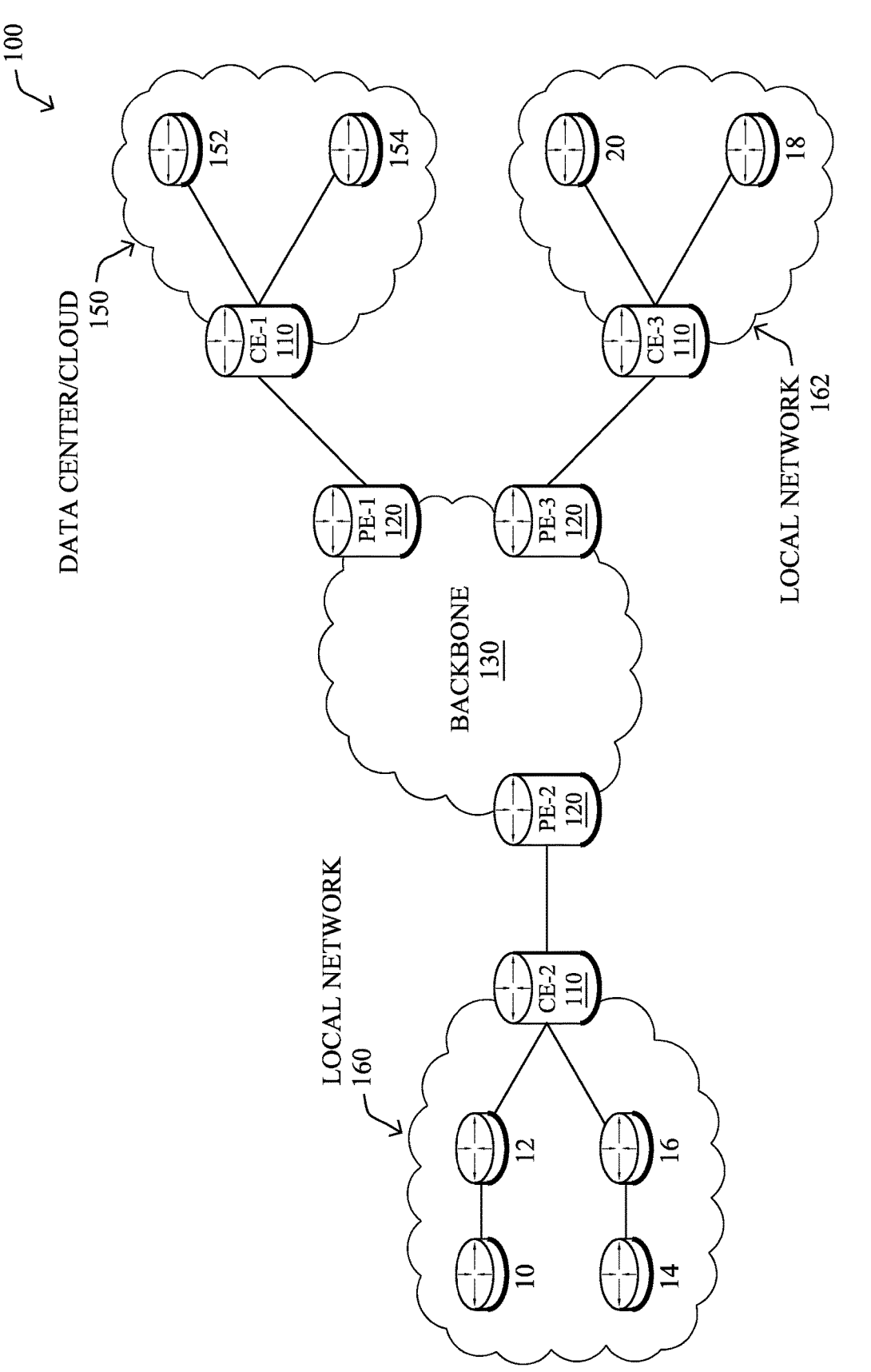

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
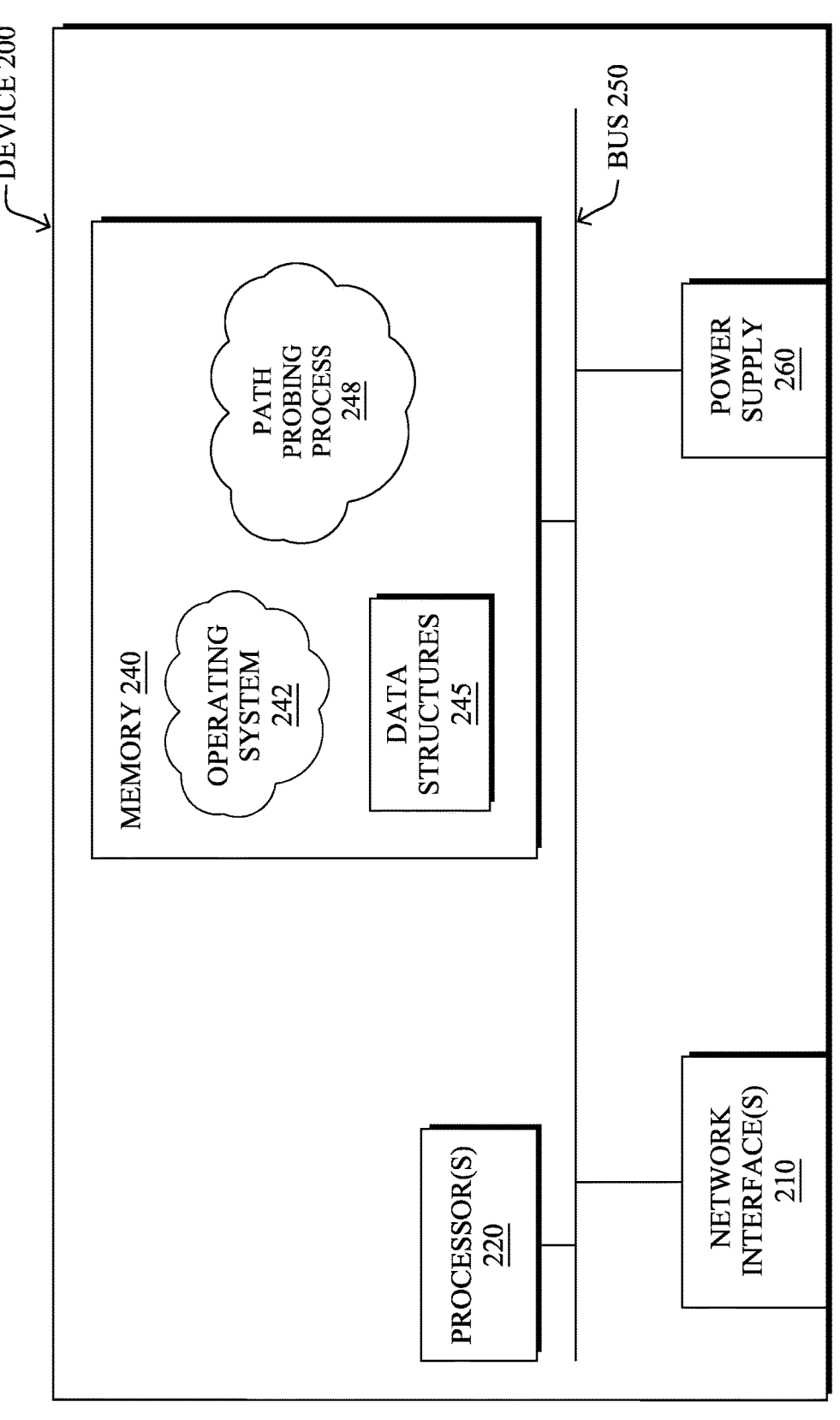
FIG. 2 illustrates an example device/node.

FIG. 2 is a schematic block diagram of an example node/device 200 that may be used with one or more embodiments described herein. As shown, device 200 may comprise one or more communication interfaces 210 (e.g., wired, wireless, etc.), at least one processor 220, and a memory 240 interconnected/coupled by a system bus 250, as well as a power supply 260 (e.g., battery, plug-in, etc.).

Communication interface(s) 210 include the mechanical, electrical, and signaling circuitry for communicating data over a communication link. To this end, communication interface(s) 210 may be configured to transmit and/or receive data using a variety of different communication protocols, such as TCP/IP, UDP, Ethernet, etc. Note that the device 200 may have multiple different types of communication interface(s) 210, e.g., wireless and wired/physical connections, and that the view herein is merely for illustration.

The memory 240 comprises a plurality of storage locations that are addressable by the processor(s) 220 and the communication interface(s) 210 for storing software programs and data structures associated with the embodiments described herein. The processor 220 may comprise necessary elements or logic adapted to execute the software programs and manipulate the data structures 245. An operating system 242, portions of which are typically resident in memory 240 and executed by the processor(s), functionally organizes the node by, inter alia, invoking network operations in support of software processors and/or services executing on the device. These software processors and/or services may comprise a path probing process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, path probing process 248 includes instructions executable by processor 220 to perform functions related to generating unified (e.g., end-to-end) path probing results of a path that includes both external and backend segments relative to a cloud location (e.g., a cloud host for an application).

As noted above, more and more enterprises are running applications in the cloud and consuming applications that run in the cloud. Synthetic network probing tools, like ThousandEyes, provide powerful insights into the performance of applications from the vantage point of virtually any location in the world. With such a synthetic probing tool, an enterprise can understand the performance of an exemplary application "myapp.com" as measured from a point of presence in San Jose, London, Tokyo, or the like. Using both application level protocols (like HTTP/S) and network level protocols (TCP, UDP, etc.), synthetic probing can provide application performance telemetry (e.g., server response times, API request response times, etc.) as well as network performance telemetry (e.g., latency, loss, jitter, etc.). Furthermore, synthetic probing tools today can also perform path trace analysis to provide a hop-by-hop visualization and performance of the network path taken from any packet originating from the origin of measurement (e.g., San Jose, London, etc.) to the destination application/service (e.g., "myapp.com"). This kind of correlation between network performance, path visibility, and application performance is important in the goal of accomplishing full-stack observability.

However, once a request is made to a web/cloud-based application, such as a page load request from a browser or an API request, the application itself may make any number of backend requests of its own to other services. These backend services could include external services (e.g., data stores, cloud API services, SaaS) that are hosted in other cloud providers or data centers. This means that these backend requests can traverse non-trivial (non-local/DC/L2) networks, like the Internet. In terms of understanding the impact of the network on overall application performance, it is important for probing tools to be able to measure the network performance, as well as map the network path taken by these external backend calls.

Figure 3:
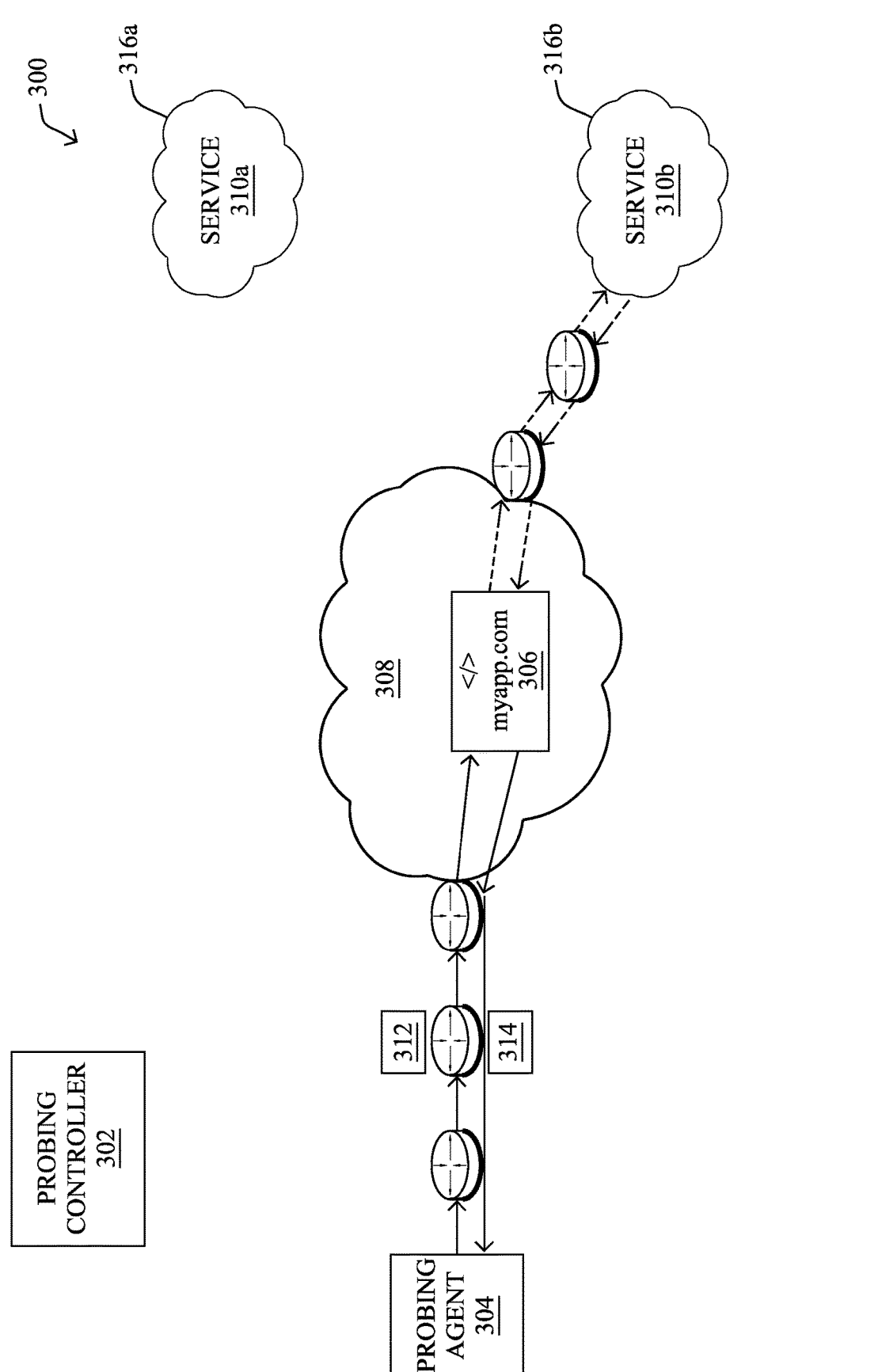
FIG. 3 illustrates an example of a network that includes a cloud-hosted application.

By way of example, FIG. 3 illustrates an example of a network that includes a cloud-hosted application. As shown, assume that network 300 includes a probing agent 304 that is overseen by a probing agent 304. For instance, probing agent 304 may be hosted by a networking device (e.g., a CE router, etc.) or even a particular endpoint user device and overseen by a probing controller 302. Now, consider the case in which probing agent 304 sends one or more probes 312 towards a particular application 306 hosted by cloud 308. In such a case, probing agent 304 may receive probing results

314 in response, which an enterprise could use to help assess performance of application 306 and/or the network connection to it.

As shown, though, assume that application 306 also leverages various backend services, such as services 310a-310b shown. Typically, services 310a-310b are hosted by different clouds than that of cloud 308, such as clouds 316a-316b, respectively. For instance, assume that application 306 is a retail application that leverages a payment processing service on the backend (e.g., service 310b), such as Stripe, via an API call. Today, this backend call would be completely missed by the path probing mechanism, meaning that probing results 314 will not include any information at all about the path segment between application 306 and backend service 310b.

This lack of transparency is often due to the load balancer associated with application 306 that functions as the ingress to cloud 308. Essentially, such a load balancer acts as a network proxy, preventing any network visibility beyond application 306 or the edge of cloud 308. Consequently, there will be a backend "blind spot" with respect to probing results 314.

——End-to-End Network Path Visibility Across Cloud Application Environments——

The techniques herein help to provide end-to-end path visibility across cloud application environments by introducing an additional smart synthetic agent that customers can run in their application cloud environments that triggers a second synthetic network probe to the appropriate backend or internal services. In some aspects, this is done by allowing the internal synthetic agent to detect when a probe is initiated from an external agent as well as determine what internal and backend cloud service the probe should target. This allows the internal network probe to generate network performance and path data for the portion of the network path between the cloud environment and other internal or backend services. In further aspects, the probing results from both the internal and external agents can be unified, resulting in complete end-to-end network performance and visibility from the end-user, through the application cloud environment, and on to key backend services. This gives enterprises that operate cloud applications a more comprehensive way to understand and optimize application performance across diverse geographic regions.

Illustratively, the techniques described herein may be performed by hardware, software, and/or firmware, such as in accordance with the path probing process 248, which may include computer executable instructions executed by the processor 220 (or independent processor of interfaces 210) to perform functions relating to the techniques described herein.

Specifically, in various embodiments, a device identifies a port associated with a backend probing agent for a cloud-hosted application. The device performs external probing of a path to the cloud-hosted application by sending a probe along the path to the port, to generate external probing results. The device triggers the backend probing agent to generate backend probing results by performing backend probing of a backend service used by the cloud-hosted application. The device causes formation of unified probing results that correlate the external probing results and the backend probing results.

Figure 4A:
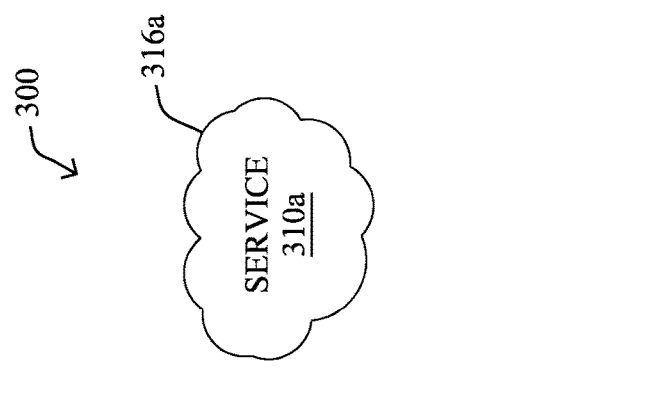
FIGS. 4A-4C illustrate examples of generating unified probing results using a correlation identifier.
Figure 4A:
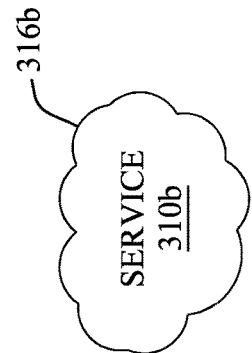
Figure 4A:
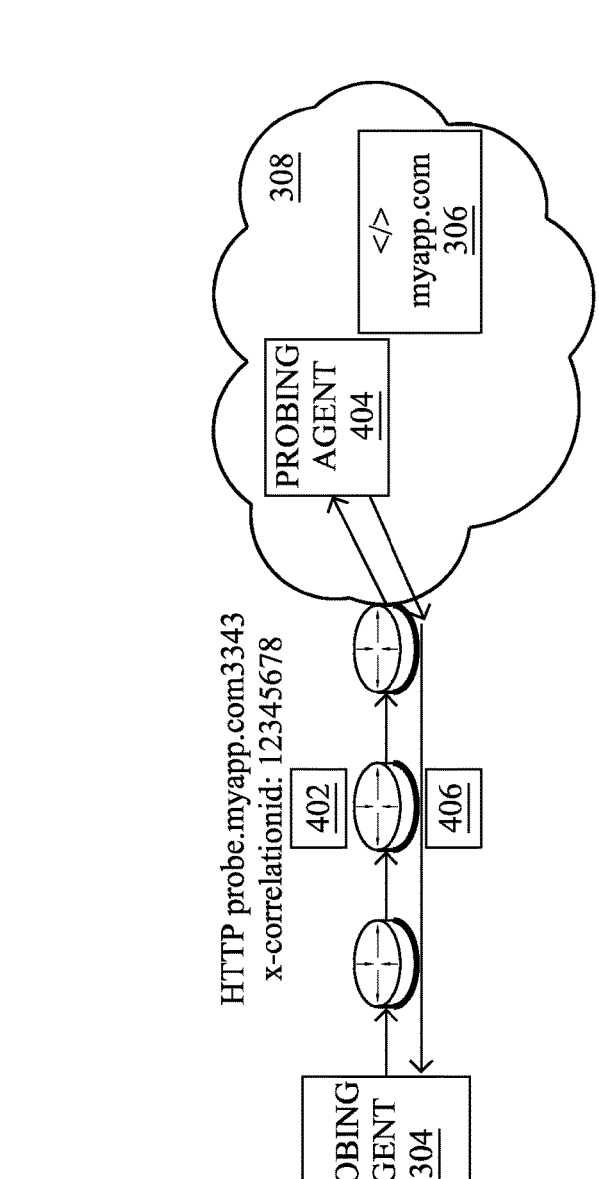
Figure 4B:
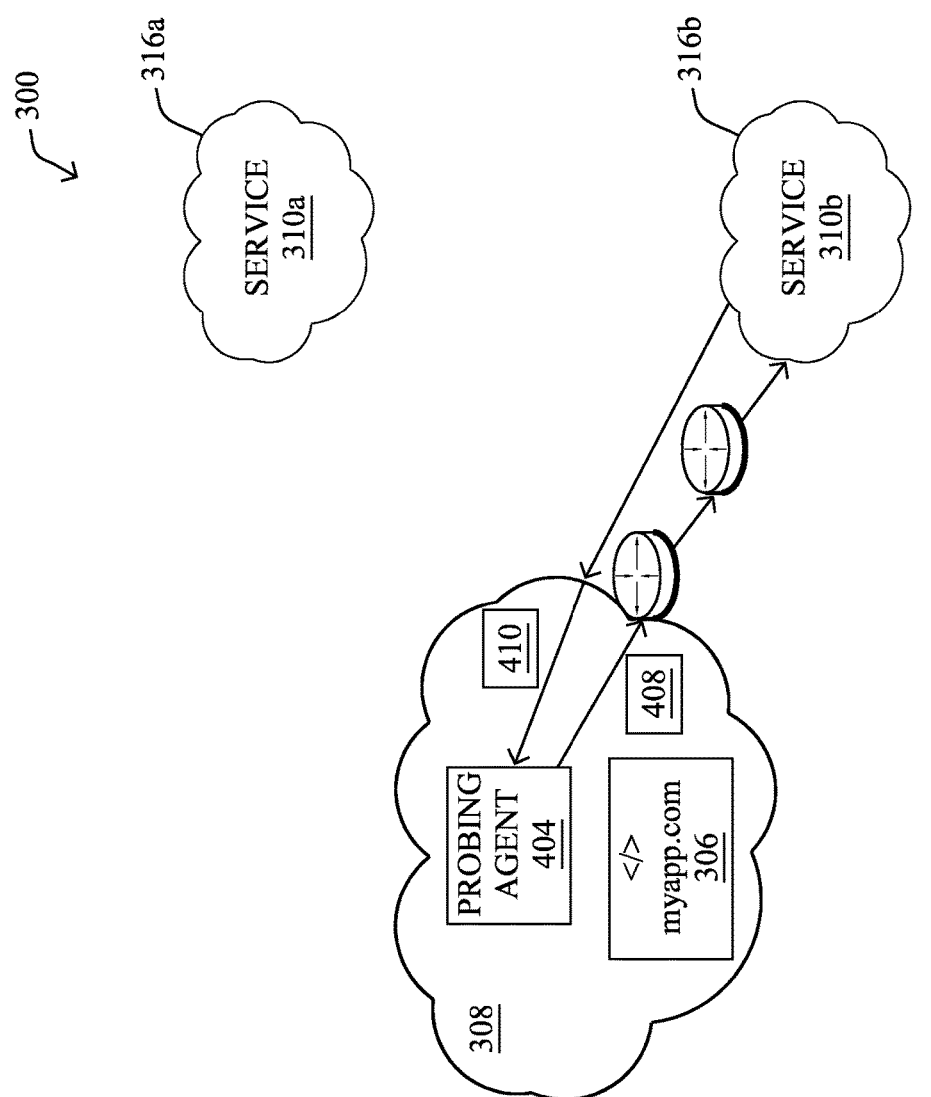
Figure 4C:
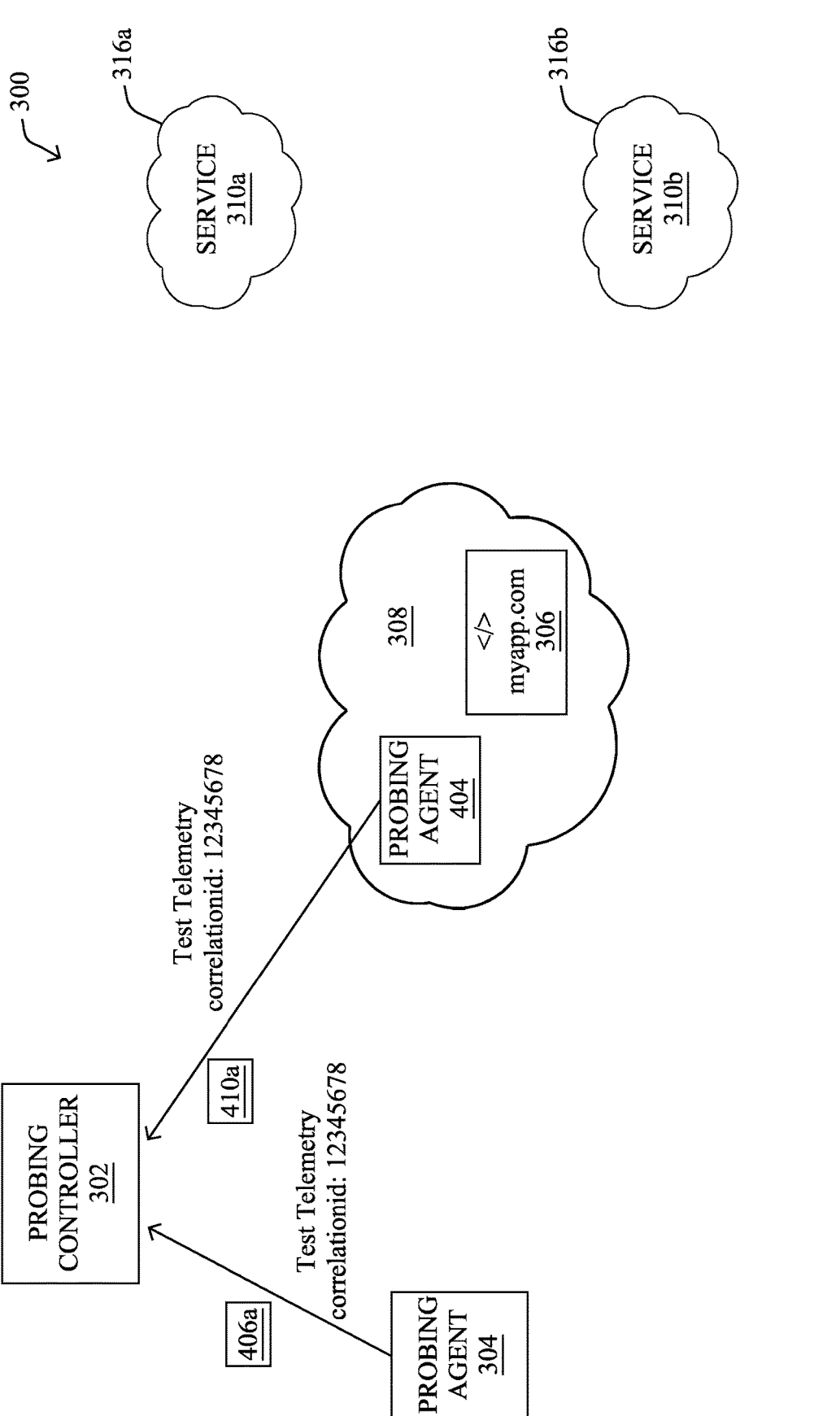

Operationally, FIGS. 4A-4C illustrate examples of generating unified probing results using a correlation identifier, according to various embodiments. Continuing the example of FIG. 3, as shown in FIG. 4A, the techniques herein propose the addition of probing agent 404 that is "internal"

to cloud 308. Such an agent may be exposed to probing agent 304 as a public IP address or domain (e.g., "probe-.myapp.com").

In general, the goal of probing agent 404 is to perform probing of the paths to the backend services accessed by application 306, such as services 310a-310b. The results of this backend probing can then be unified with the external probing performed by probing agent 304, to provide an end-to-end view from any given location in the network (e.g., the location of probing agent 304).

According to various embodiments, one potential way to unify the probing results from probing agent 304 and probing agent 404 would be for probing agent 304 and probing agent 404 to send the respective probing results to probing controller 302 for unification. However, doing so still requires a mechanism that allows probing controller 302 to correlate the two sets of probing results. In some embodiments, this can be achieved by probing agent 304 and probing agent 404 including the same correlation identifier in their respective results, thereby allowing probing controller 302 to correlate the two sets of results into a unified set of probing results.

By way of example, probing agent 304 may generate a correlation identifier, such as '12345678' for a particular probing test. Alternatively, probing controller 302 may generate such an identifier and provide it to probing agent 304 for use. In turn, probing agent 304 may include this identifier in the probe 402 that it sends towards cloud 308 to generate the external probing results 406. As would be appreciated, probe 402 may take various forms such as a TCP probe, ICMP probe, HTTP probe, or the like.

In various embodiments, as shown in FIG. 4B, probe 402 from probing agent 304 may trigger probing agent 404 to perform internal/backend probing of a backend service, such as service 310b, by sending its own synthetic probe 408 towards it, thereby generating backend probing results 410. In some embodiments, probing agent 404 may also associate the correlation identifier sent by probing agent 304 with backend probing results 410.

According to various embodiments, the port to which probe 402 was sent by probing agent 304 may control which of the backend services (e.g., services 310a-310b) probing agent 404 is to perform its backend probing. For instance, if probing agent 304 sends a probe to probe.myapp.com:3342, probing agent 404 may perform backend probing of service 310a. However, if probing agent 304 sends a probe to probe.myapp.com:3343, probing agent 404 may perform backend probing of service 310b, instead.

As shown in FIG. 4C, once probing agent 404 has received backend probing results 410, it may include the correlation identifier from probing agent 304 in it, to form probing result notification 410a. In turn, it may report result notification 410a to probing controller 302. Similarly, probing agent 304 may include the correlation identifier in external probing results 406 to form its own results notification 406a and send it to probing controller 302.

Once probing controller 302 has received its results notification 406a and results notification 410a from probing agent 304 and probing agent 404, respectively, it may correlate the two sets of results based on the correlation identifier, to unify them into an end-to-end set of probing results. Probing controller 302 may then report the unified results to a user interface for review, to a network automation system (e.g., to affect the routing of the application traffic), or elsewhere for other uses.

Figure 5:
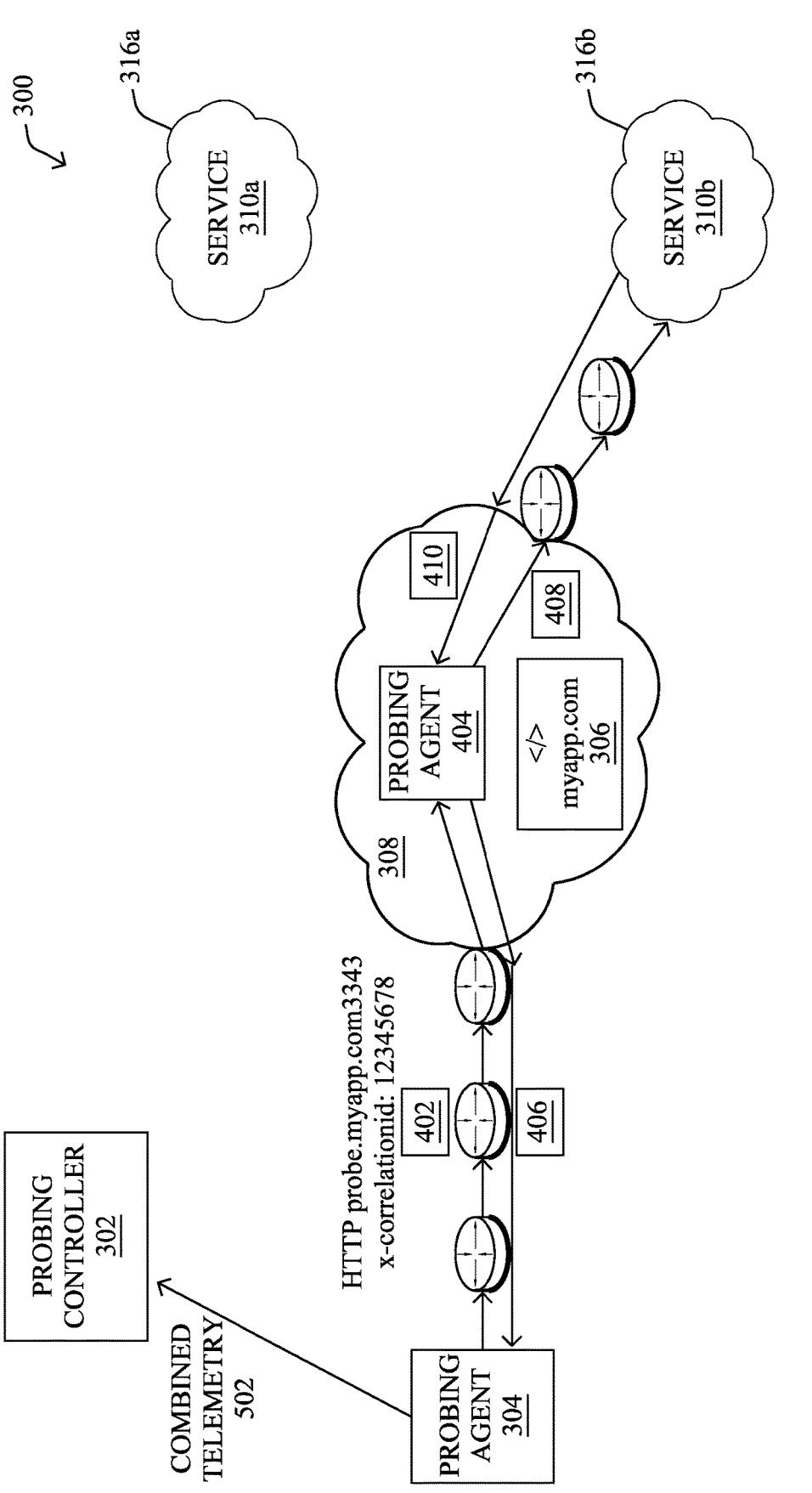
FIG. 5 illustrates an example of generating unified probing results using probe forwarding.

According to further embodiments, FIG. 5 illustrates an example of generating unified probing results using probe forwarding using an alternative approach. More specifically, rather than probing agent 304 and probing agent 404 separately reporting their probing results to probing controller 302 for correlation, probing agent 304 may instead unify the probing results before reporting the combined telemetry 502 to probing controller 302.

To do so, probing results 314 may be configured to function as a transparent network address translator (NAT). In such a case, probing agent 304 may send requests (e.g., probe 402) at the network layer (e.g., TCP or ICMP), rather than at the application layer (e.g., HTTP). In turn, probing agent 404 may then perform address translation on probe 402, to convert it into probe 408 for forwarding on to service 310b. In some embodiments, similar to the approach illustrated in FIGS. 4A-4C, the selection of the backend service to be probed may be a function of the port to which probing agent 304 send probe 402.

For instance, a TCP/ICMP probe 402 from probing agent 304 may trigger probing agent 404 to modify the source and destination IP addresses of the packet such that the source address is that of probing agent 404 instead of probing agent 304 and the destination address is that of service 310b instead of probing agent 404. Then, once probing agent 404 has received backend probing results 410, it may reverse this process and send the results 406 back to probing agent 304. Here, since probe 402 has fully traversed both the external path to cloud 308, as well as the backend path between cloud 308 and service 310b, probing results 406 will be unified results that are end-to-end between the location of probing agent 304 and backend service 310b. This allows probing agent 304 to simply report these combined results to probing controller 302 as combined telemetry 502.

Note that in the approach shown in FIG. 5, the use of a correlation identifier is no longer needed, as the NAT functionality of probing agent 404 allows probing agent 304 to probe the entire end-to-end path. Thus, for security reasons, probing agent 404 may also be configured to only allow such probing requests from approved external agents, such as probing agent 304, to avoid a denial of service (DOS) attack.

In yet a further embodiment, the second probe may be given the same domain name as application 306 and port forwarding rules configured in the application load balancer/ingress service to forward packets to probing agent 404, rather than the application service.

In an additional embodiment, a further variation may entail using application/API gateway routing to trigger requests to probing agent 404 for backend probing. This would require requests from probing agent 304 to be application level requests with a specific path. For example, probing agent 304 could initiate a request to the application POST https://myapp.com/probe/service 310b, that would result in application 306 making a call to the internal address, port, etc. of probing agent 404, to trigger the backend probing. The advantage here is that HTTPS authentication could be leveraged to avoid any unauthorized triggering of backend probing by probing agent 404.

Figure 6:
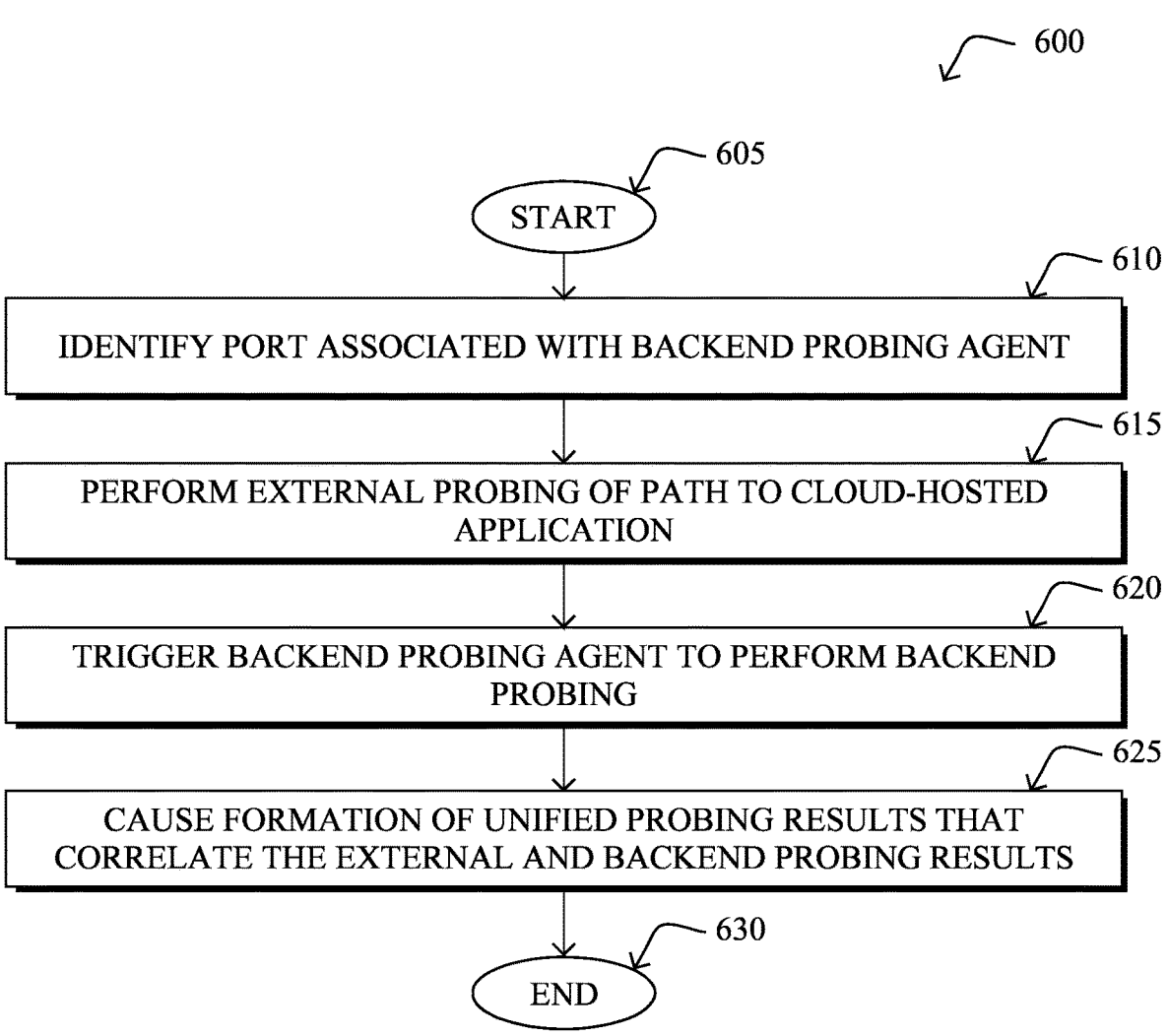
FIG. 6 illustrates an example simplified procedure for forming unified probing results for a cloud-hosted application.

FIG. 6 illustrates an example simplified procedure (e.g., a method) for forming unified probing results for a cloud-hosted application, in accordance with one or more embodiments described herein. For example, a non-generic, specifically configured device/apparatus (e.g., device 200), may perform procedure 600 by executing stored instructions (e.g., path probing process 248). Procedure 600 may start at step 605 and continues on to step 610 where, as described in greater detail above, the device may identify a port associated with a backend probing agent for a cloud-hosted application.

At step 615, as detailed above, the device may perform external probing of a path to the cloud-hosted application by sending a probe along the path to the port, to generate external probing results. In some embodiments, the probe comprises an application level request.

At step 620, the device may trigger the backend probing agent to generate backend probing results by performing backend probing of a backend service used by the cloud-hosted application, as describe in greater detail above. In various embodiments, the backend probing agent identifies the backend service based on the port. In some embodiments, the device generates a correlation identifier for inclusion in the probe and the backend probing agent associates the correlation identifier with the backend probing results. In one embodiment, the backend probing agent performs the backend probing by forwarding the probe towards the backend service. In some embodiments, the backend probing agent performs network address translation on the probe based on the port to which it was sent. In another embodiment, performing the backend probing comprises forwarding the probe towards the backend service via a load balancer or ingress service associated with the cloud-hosted application. In one embodiment, the cloud-hosted application accesses the backend service via an application programming interface (API).

At step 625, as detailed above, the device may cause formation of unified probing results that correlate the external probing results and the backend probing results. In some embodiments, the device causes formation of the unified probing results in part by sending the external probing results to a probing controller. In additional embodiments, the device causes formation of the unified probing results in part by causing the backend probing agent to send the backend probing results to a probing controller.

Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for end-to-end network path visibility across cloud application environments, it is to be understood that various other adaptations and modifications may be made within the spirit and scope of the embodiments herein. For example, while certain embodiments are described herein with respect to using certain wired and/or wireless protocols, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:

identifying, by a device, a port associated with a backend probing agent for a cloud-hosted application;

performing, by the device, external probing of a path to the cloud-hosted application by sending a probe along the path to the port, to generate external probing results;

triggering, by the device, the backend probing agent to generate backend probing results by performing backend probing of a backend service that is used by and external to the cloud-hosted application and that is invoked by the cloud-hosted application via an application programming interface (API) request to the backend service, wherein performing the backend probing comprises forwarding the probe towards the backend service via a load balancer or ingress service associated with the cloud-hosted application; and causing, by the device, formation of unified probing results that correlate the external probing results and the backend probing results.

2. The method as in claim 1, wherein the backend probing agent identifies the backend service based on the port.

3. The method as in claim 1, wherein the device causes formation of the unified probing results in part by sending the external probing results to a probing controller.

4. The method as in claim 1, wherein the device causes formation of the unified probing results in part by causing the backend probing agent to send the backend probing results to a probing controller.

5. The method as in claim 1, further comprising:

generating a correlation identifier for inclusion in the probe, wherein the backend probing agent associates the correlation identifier with the backend probing results.

6. The method as in claim 1, wherein the backend probing agent performs the backend probing by forwarding the probe towards the backend service.

7. The method as in claim 6, wherein the backend probing agent performs network address translation on the probe based on the port to which it was sent.

8. The method as in claim 1, wherein the probe comprises an application level request.

9. An apparatus, comprising: one or more network interfaces to communicate in a backhaul mesh for a wireless network;

a processor coupled to the one or more network interfaces and configured to execute one or more processes; and a memory configured to store a process that is executable by the processor, the process when executed configured to:

identify a port associated with a backend probing agent for a cloud-hosted application;

perform external probing of a path to the cloud-hosted application by sending a probe along the path to the port, to generate external probing results;

trigger the backend probing agent to generate backend probing results by performing backend probing of a backend service that is used by and external to the cloud-hosted application and that is invoked by the cloud-hosted application via an application programming interface (API) request to the backend service, wherein performing the backend probing comprises forwarding the probe towards the backend service via a load balancer or ingress service associated with the cloud-hosted application; and cause formation of unified probing results that correlate the external probing results and the backend probing results.

10. The apparatus as in claim 9, wherein the backend probing agent identifies the backend service based on the port.

11. The apparatus as in claim 9, wherein the apparatus causes formation of the unified probing results in part by sending the external probing results to a probing controller.

12. The apparatus as in claim 9, wherein the apparatus causes formation of the unified probing results in part by causing the backend probing agent to send the backend probing results to a probing controller.

13. The apparatus as in claim 9, further comprising:

generating a correlation identifier for inclusion in the probe, wherein the backend probing agent associates the correlation identifier with the backend probing results.

14. The apparatus as in claim 9, wherein the backend probing agent performs the backend probing by forwarding the probe towards the backend service.

15. The apparatus as in claim 14, wherein the backend probing agent performs network address translation on the probe based on the port to which it was sent.

16. The apparatus as in claim 9, wherein the probe comprises an application level request.

17. A tangible, non-transitory, computer-readable medium storing program instructions that cause a device to execute a process comprising:

identifying, by the device, a port associated with a backend probing agent for a cloud-hosted application;

performing, by the device, external probing of a path to the cloud-hosted application by sending a probe along the path to the port, to generate external probing results;

triggering, by the device, the backend probing agent to generate backend probing results by performing backend probing of a backend service that is used by and external to the cloud-hosted application and that is invoked by the cloud-hosted application via an application programming interface (API) request to the backend service, wherein performing the backend probing comprises forwarding the probe towards the backend service via a load balancer or ingress service associated with the cloud-hosted application; and causing, by the device, formation of unified probing results that correlate the external probing results and the backend probing results.

* * * * *